US012594537B2

(12) United States Patent
Marr, Jr. et al.

(10) Patent No.: US 12,594,537 B2
(45) Date of Patent: Apr. 7, 2026

(54) SYSTEMS AND METHODS FOR DECOMPOSITION OF MOLECULES

(71) Applicant: Epirus, Inc., Hawthorne, CA (US)

(72) Inventors: Harry Bourne Marr, Jr., Manhattan Beach, CA (US); Morgan Arline Bedingfield, Potomac, MD (US); Allison Ivey Goehringer, Wellesley, MA (US); William Griffin Dower, Torrance, CA (US); Jar Jueh Lee, Irvine, CA (US); Lavanya Govind Rau, Irvine, CA (US); Grant Lovely Verstandig, McLean, VA (US); Skyler Evan Granatir, Marina Del Rey, CA (US)

(73) Assignee: Epirus, Inc., Torrance, CA (US)

( * ) Notice: Subject to any disclaimer, the term of this patent is extended or adjusted under 35 U.S.C. 154(b) by 736 days.

(21) Appl. No.: 17/812,990

(22) Filed: Jul. 15, 2022

(65) Prior Publication Data

US 2023/0015528 A1     Jan. 19, 2023

Related U.S. Application Data

(60) Provisional application No. 63/223,535, filed on Jul. 19, 2021.

(51) Int. Cl.
  *B01J 19/12*     (2006.01)
  *B01J 19/08*     (2006.01)
(52) U.S. Cl.
  CPC ........... *B01J 19/129* (2013.01); *B01J 19/088* (2013.01); *B01J 2219/0892* (2013.01); *B01J 2219/0894* (2013.01)
(58) Field of Classification Search
  CPC .................... B01J 19/129; B01J 19/088; B01J 2219/0892; B01J 2219/0894
  See application file for complete search history.

(56) References Cited

U.S. PATENT DOCUMENTS

| | | | | |
|---|---|---|---|---|
| 5,746,984 A | * | 5/1998 | Hoard | F01N 3/0842 422/186.04 |
| 5,782,085 A | * | 7/1998 | Steinwandel | B01J 19/126 60/275 |

(Continued)

FOREIGN PATENT DOCUMENTS

| | | |
|---|---|---|
| JP | 2018-006718 | 1/2018 |
| WO | WO 2016/057341 | 4/2016 |

(Continued)

OTHER PUBLICATIONS

International Search Report and Written Opinion issued in PCT/US2022/073807 on Oct. 24, 2022.

(Continued)

*Primary Examiner* — Sean M Luck
(74) *Attorney, Agent, or Firm* — Knobbe, Martens, Olson & Bear, LLP

(57) ABSTRACT

A system for disassociating molecules of a gas based on RF power. Characteristics of the RF power can be tuned to increase disassociation efficiency. The system can include a disassociation chamber configured to enclose a volume of a gas and a radio frequency (RF) power source configured to provide RF power to the disassociation chamber. The RF power source can include a radio-frequency generator configured to generate an electromagnetic (EM) radiation having a frequency between about 20 MHz and about 10 THz, a radio-frequency amplifier configured to amplify the generated EM radiation, and an output channel to direct the amplified EM radiation towards the volume of gas.

20 Claims, 5 Drawing Sheets

(56) References Cited

U.S. PATENT DOCUMENTS

| | | | |
|---|---|---|---|
| 6,422,002 B1 | 7/2002 | Whealton | |
| 8,633,648 B2 | 1/2014 | Tanibata et al. | |
| 8,852,522 B1* | 10/2014 | Gorin | B01J 19/088 |
| | | | 422/186.29 |
| 9,144,858 B2 | 9/2015 | Lee et al. | |
| 9,237,639 B2 | 1/2016 | Lee et al. | |
| 9,699,880 B2 | 7/2017 | Lee et al. | |
| 10,832,893 B2 | 11/2020 | McClelland et al. | |
| 10,832,894 B2 | 11/2020 | McClelland et al. | |
| 10,840,064 B2 | 11/2020 | Leonard, III et al. | |
| 10,854,429 B2 | 12/2020 | Leonard, III et al. | |
| 11,388,809 B2 | 7/2022 | Tom et al. | |
| 11,469,078 B2 | 10/2022 | Tom et al. | |
| 11,658,410 B2 | 5/2023 | So et al. | |
| 2005/0178746 A1* | 8/2005 | Gorin | H01J 37/32357 |
| | | | 219/121.43 |
| 2009/0272653 A1* | 11/2009 | Beech | C01B 3/342 |
| | | | 205/637 |
| 2013/0126488 A1 | 5/2013 | Lee et al. | |
| 2013/0233849 A1* | 9/2013 | Saida | B01J 19/126 |
| | | | 219/756 |
| 2014/0125215 A1 | 5/2014 | Lee | |
| 2015/0336043 A1 | 11/2015 | Sadasivan Vijayakumari | |
| 2016/0222516 A1 | 8/2016 | Ikeda | |
| 2018/0057755 A1* | 3/2018 | Skoptsov | B01J 19/126 |
| 2018/0126659 A1 | 5/2018 | Ahmad | |
| 2020/0306716 A1 | 10/2020 | Leonard, III et al. | |
| 2020/0312627 A1 | 10/2020 | McClelland et al. | |
| 2020/0312628 A1 | 10/2020 | McClelland et al. | |
| 2020/0312629 A1 | 10/2020 | Leonard, III et al. | |
| 2020/0312638 A1 | 10/2020 | Leonard, III et al. | |
| 2020/0312639 A1 | 10/2020 | Tom et al. | |
| 2020/0314994 A1 | 10/2020 | Tom et al. | |

FOREIGN PATENT DOCUMENTS

| | | |
|---|---|---|
| WO | WO 2020/185780 | 9/2020 |
| WO | WO 2023/004270 | 1/2023 |

OTHER PUBLICATIONS

International Preliminary Report on Patentability and Written Opinion in application No. PCT/US2022/073807, dated Jan. 18, 2024, in 10 pages.

* cited by examiner

SYSTEMS AND METHODS FOR DECOMPOSITION OF MOLECULES

CROSS-REFERENCE TO RELATED APPLICATIONS

This application claims the benefit of priority to U.S. Provisional Patent Application No. 63/223,535, filed on Jul. 19, 2021, the contents of each of the above-identified application are incorporated herein by reference.

TECHNICAL FIELD

This disclosure relates generally to radio frequency (RF) systems; specifically, use of RF systems to dissaociate one or more molecules. These inventions relate to the field of commercial technology for using RF systems to reduce the amount of greenhouse gases emitted.

BACKGROUND

Reducing the emission of greenhouse gases is an urgent need for the future of humanity Capture and sequestration of Carbon dioxide ($CO_2$)—one of the main greenhouse gases is a technology that is being explored to reduce carbon dioxide emission power plants and other industrial facilities. Carbon capture and sequestration includes capturing carbon dioxide, transporting the captured carbon dioxide to a carbon dioxide storage facility and sequestering/storing the carbon dioxide in the storage facility. Carbon dioxide ($CO_2$) capture and sequestration can be a cost prohibitive process. Disassociating carbon dioxide and other greenhouse gas molecules using microwave energy is a promising technology that can overcome some of the difficulties surrounding carbon capture and sequestration technology. Thus energy efficient compact microwave systems that can disassociate carbon dioxide and other greenhouse gas molecules are attractive.

SUMMARY

Various implementations described herein are directed towards systems and methods to disassociate carbon dioxide and/or other greenhouse gas molecules. The systems configured to disassociate carbon dioxide and/or other greenhouse gas molecules comprise a radio frequency (RF) power source that is configured to emit radiation in the radio frequency spectrum. The emitted radiation has sufficient energy to disassociate molecules of carbon dioxide and/or other greenhouse gases. In some implementations, the system can comprise a radio frequency (RF) electrode that can generate a plasma which can effect disassociation of carbon dioxide and/or other greenhouse gas molecules. In some implementations of the systems described herein, the frequency and power of the emitted radiation can be configured to ionize molecules of carbon dioxide and/or other greenhouse gases. The frequency and power of the emitted radiation can be tuned to disassociate the ionized molecules of carbon dioxide and/or other greenhouse gases. Without any loss of generality, the systems described herein can be configured to emit radiation in frequency range from about 20 MHz and 100 GHz (e.g., between about 20 MHz and 200 MHz, 100 MHz and 1.3 GHz, 500 MHz and 3.2 GHz, 1.0 GHz and 3.6 GHz, 3.0 GHz and 7.0 GHz, 6.0 GHz and 10.0 GHz, 10.0 GHz and 18.0 GHz, 15.0 GHz and 50.0 GHz, 30.0 GHz and 100 GHz, or any other frequency in a range defined by any of the above-described numbers).

Various implementations of the RF power source employed to disassociate carbon dioxide and/or other greenhouse gas molecules comprise a RF generator and one or more solid-state amplifiers configured to amplify the generated RF radiation. Some implementations of the RF power source can comprise a bias controller that is configured to provide the bias voltages and/or currents provided to the one or more amplifiers. The bias controller can be configured to vary the bias voltages and/or currents provided to the one or more amplifiers to increase or optimize one or more figures of merit of the one or more amplifiers. The one or more figures of merit can comprise power efficiency, linearity, gain, output power, etc. The bias controller can be configured to set or change the operating conditions of the one or more amplifiers. The one or more amplifiers can comprise high power Gallium Nitride (GaN), silicon metal oxide semiconductor field effect transistors (MOSFETS), other III-V devices, or other semiconductor-based radio frequency (RF) amplifiers.

Various implementations of the bias controller described herein are configured to provide biasing voltages/currents to turn on/off the amplifiers and/or dynamically adjust the biasing voltages/currents to change the operating conditions of the amplifier. For example, the implementations of the bias controller described herein are configured to dynamically change the operating condition of an amplifier from operating in a saturation regime to operating in a linear regime or vice-versa. The bias controller allows to dynamically adjust between any class of amplifier, including but not limited to class A, class AB, class B, class C, class D, class E, class F, class G, class H, Class S and class T. These classes of amplifiers have to do with what cycle of an RF waveform, such as a sinusoid, draw current. In a class A amplifier, the current is drawn throughout the entire waveform cycle, and is the most linear, such that intermodulation distortion products are the lowest and the amplifier has the highest signal dynamic range. By changing the bias currents/voltages, the amplifier can be switched to different classes of linear amplifier and make a tradeoff between power efficiency and linearity. The bias controller can also completely turn off the amplifier off when no RF signals are flowing through the amplifier and being amplified. Turning off the bias power to the amplifier completely minimizes leakage and quiescent current. The amplifiers driven by the bias controller described herein can be configured to produce high-power RF signals with low average power, such as, for example average power less than or equal to about 15 Kilowatts. The bias controller can be embodied as field programmable gate arrays (FPGAs), application specific integrated circuit (ASICs), analog circuits, and/or monolithic multiwave integrated circuits (MMICs).

Implementations of the bias controller can be configured to adjust the biasing currents/voltages of the amplifier based on information obtained about the input signal characteristics, output signal characteristics, system operating conditions (e.g., operating temperature, operating currents/voltages at various terminals of the amplifier/system, etc.), an input received from a user or an electronic processing system controlling the biasing systems and/or by information obtained from look-up tables that provide an understanding of the state of the amplifier system. The biasing voltages/currents can be adjusted in real time or substantially in real time (e.g., within about 1 ns and about 50 ns or more) after receiving an input or obtaining information regarding the input signal characteristics, output signal characteristics and/or system operating conditions. For example, various implementations of the bias controller can be configured to sense/obtain input signal characteristics, output signal characteristics, system operating conditions (e.g., operating temperature, operating currents/voltages at various terminals of the amplifier/system, etc.) and/or information from one or more look-up tables and adjust the biasing currents/voltages provided to the amplifier in real time or substantially in real time to optimize one or more of the following figures of merit: amplifier gain, output power, drain/power efficiency, linearity, and signal-to-noise ratio. For example, various implementations of the bias controller can be configured to sense/obtain input signal characteristics, output signal characteristics, system operating conditions (e.g., operating temperature, operating currents/voltages at various terminals of the amplifier/system, etc.) and/or information from one or more look-up tables and adjust the biasing current/voltages provided to the amplifier in real time or substantially in real time to increase drain/power efficiency and linearity for a target output power. As another example, various implementations of the bias controller can be configured to sense/obtain input signal characteristics, output signal characteristics, system operating conditions (e.g., operating temperature, operating currents/voltages at various terminals of the amplifier/system, etc.) and/or information from one or more look-up tables and adjust the biasing current/voltages provided to the amplifier in real time or substantially in real time to increase linearity for a target drain/power efficiency. As yet another example, various implementations of the bias controller are configured to turn on/turn off the biasing current/voltage provided to the amplifier based on whether or not a signal to be amplified is input to the amplifier. As another example, various implementations of the bias controller are configured to adjust and/or turn off the biasing current/voltage provided to the amplifier to reduce damaging the amplifier.

The systems, methods, modules, and devices of this disclosure each have several innovative aspects, no single one of which is solely responsible for the desirable attributes disclosed herein. A variety of example systems, modules, and methods are provided below.

Embodiment 1: A molecule disassociation system configured to disassociate one or more gas molecules, the system comprising:

a disassociation chamber configured to enclose a volume of a gas; and a radio frequency (RF) power source configured to provide RF power to the disassociation chamber, the RF power source comprising:

a radio-frequency generator configured to generate an electromagnetic (EM) radiation having a frequency between about 20 MHz and about 10 THz;

a radio-frequency amplifier configured to amplify the generated EM radiation; and an output channel to direct the amplified EM radiation towards the volume of gas.

Embodiment 2: The system of Embodiment 1, wherein the output channel comprises a waveguide, an antenna or an electrode.

Embodiment 3: The system of any of Embodiments 1-2, wherein the applied RF power generates a plasma within the disassociation chamber.

Embodiment 4: The system of Embodiment 3, wherein the generated plasma is a room temperature plasma.

Embodiment 5: The system of any of Embodiments 1-4, wherein a power or a frequency of the applied RF power is configured to disassociate one or more molecules of the gas.

Embodiment 6: The system of any of Embodiment 1-5, wherein the gas comprises at least one of carbon dioxide, methane, a greenhouse gas, carbon monoxide, hydrocarbons, sulfur dioxide, oxygen, or water vapor.

Embodiment 7: The system of any of Embodiments 1-6, wherein the disassociation chamber comprises an inlet to intake the gas and an outlet to remove byproducts after disassociation.

Embodiment 8: The system of any of Embodiments 1-7, wherein a catalyst is introduced into the disassociation to increase efficiency of disassociation of the gas molecule.

Embodiment 9: The system of Embodiment 8, wherein the catalyst comprises steam, copper or titanium dioxide.

Embodiment 10: The system of any of Embodiments 1-9, wherein a frequency of the applied RF power is adjusted to match a resonant frequency of a gas molecule to be disassociated.

Embodiment 11: The system of any of Embodiments 1-9, wherein a frequency of the applied RF power is adjusted to match a relaxation frequency of a byproduct.

Embodiment 12: The system of any of Embodiments 1-11, wherein a power level of the applied RF power is adjusted to generate a plasma within the disassociation chamber.

Embodiment 13: The system of any of Embodiments 1-11, wherein a power level of the applied RF power is configured to raise temperature of the gas in the disassociation chamber to a temperature between about 3000 degree Kelvin and about 7000 degree Kelvin.

Embodiment 14: The system of any of Embodiments 1-11, wherein a power level of the applied RF power is configured to ionize the molecules of the gas.

Embodiment 15: The system of any of Embodiments 1-14, wherein the RF power source comprises a plurality of electromagnetic (EM) radiators comprising one or more RF generators, one or more RF amplifiers, and a plurality of antennas.

Embodiment 16: The system of Embodiment 15, wherein an antenna of the plurality of antennas comprises a dielectric lens to focus EM radiation in a volume of the disassociation chamber.

Embodiment 17: The system of any of Embodiments 15-16, wherein the plurality of EM radiators are co-planar.

Embodiment 18: The system of Embodiment 17, wherein the plurality of EM radiators are arranged in a circle.

Embodiment 19: The system of any of Embodiments 15-16, wherein the plurality of EM radiators are non-coplanar.

Embodiment 20: The system of Embodiment 19, wherein the plurality of EM radiators are arranged in a spiral.

Embodiment 21: The system of any of Embodiments 1-20, wherein the disassociation chamber comprises a portion of a flue gas stack, a chimney, an exhaust pipes or a smokestack.

Embodiment 22: The system of any of Embodiments 1-21, further comprising a control system configured to regulate a flow rate of the gas into the disassociation chamber.

Embodiment 23: The system of Embodiment 22, wherein the control system is configured to regulate the flow rate of the gaseous medium is between about 0.1 liter/minute and about 1000 liter/minute.

Embodiment 24: The system of any of Embodiments 1-23, further comprising a bias control module configured to adjust a bias power provided to the RF amplifier.

Embodiment 25: The system of Embodiment 24, wherein the bias control module further comprises a sensor configured to sense a current or a voltage from the RF amplifier.

Embodiment 26: The system of Embodiment 25, wherein the bias control module is configured to adjust a bias power provided to the RF amplifier based on the sensed current or voltage.

Embodiment 27: The system of any of Embodiments 1-26 further comprising a gas sensor.

Embodiment 28: The system of Embodiment 27, wherein the gas sensor is configured to determine or estimate a type or a concentration of a gas in the gaseous medium.

Embodiment 29: The system of any of Embodiments 1-28, further comprising a temperature sensor configured to determine a temperature of the gas in the disassociation chamber.

Embodiment 30: The system of any of Embodiments 1-29, wherein the applied RF power is a pulsed power.

Embodiment 31: The system of Embodiment 30, wherein the pulsed power has a duty cycle between about 1% and about 50%.

Embodiment 32: The system of any of Embodiments 1-31, wherein the disassociation chamber comprises large molecules to increase mean free path between the disassociated products.

BRIEF DESCRIPTION OF THE FIGURES

The disclosure is more fully appreciated in connection with the following detailed description taken in conjunction with the accompanying drawings, in which.

Like reference numerals refer to corresponding parts throughout the several views of the drawings.

DETAILED DESCRIPTION

Disassociating carbon dioxide ($CO_2$) molecule is a promising technology to reduce carbon dioxide emission. Depending on the process used to breakdown the carbon dioxide molecule, the resulting byproducts can comprise carbon monoxide, oxygen, methane, water and hydrogen. Conversion of carbon dioxide into carbon monoxide, oxygen, methane, water and hydrogen is attractive because in addition to reducing the amount of carbon dioxide emitted, the byproducts have many industrial applications. For example, Carbon monoxide is used widely by the chemical industry in the production of inorganic chemicals (metal carbonyls, titanium dioxide), organic chemicals (benzaldehyde and citric acid), and chemical intermediates (toluene and diisocyanates, used to produce polyurethane). Carbon monoxide in combination with several other gases (hydrogen, nitrogen, methane and carbon dioxide) provides a fuel gas, called syngas, which is used as a substitute for natural gas. Syngas can also be used to produce oxygenates. Carbon monoxide is also used as a reducing agent in metals refining. In the food packaging industry, limited concentrations of carbon monoxide is used in meat, poultry and fish to maintain wholesomeness and provide flexibility in distribution.

One method of disassociating carbon dioxide includes employing high power microwave radiation to break down carbon dioxide molecules. Plasma-assisted carbon dioxide dissociation is another promising technique to reduce atmospheric concentrations of carbon dioxide. In this method, plasma can be used to break down the carbon dioxide molecule into carbon monoxide and oxygen. The plasma conditions can be made suitable for this decomposition to occur. Microwave assisted plasmas can have high energy efficiency. To increase disassociation of carbon dioxide without sacrificing energy efficiency, a catalyst can be used. Possible catalysts include copper, titanium dioxide, steam, etc. RF electromagnetic fields can be applied to generate weakly ionized plasma at low pressures, generally in the range 1-103 Pa. RF electromagnetic fields also have the capacity to generate high electron densities to increase collisions and stimulate dissociation.

Recent advances made in solid state technology has enabled the ability to generate high power radio frequency (RF) radiation in a small form factor. Highly power efficient RF sources are also made possible by employing software defined RF generators and energy efficient RF amplifiers. Such compact RF power sources with high power densities that operate at high power efficiency can be employed to disassociate carbon dioxide in power plants and other industrial environments. The compact RF power sources employed to disassociate carbon dioxide may not require elaborate cooling mechanism.

Figure 1:
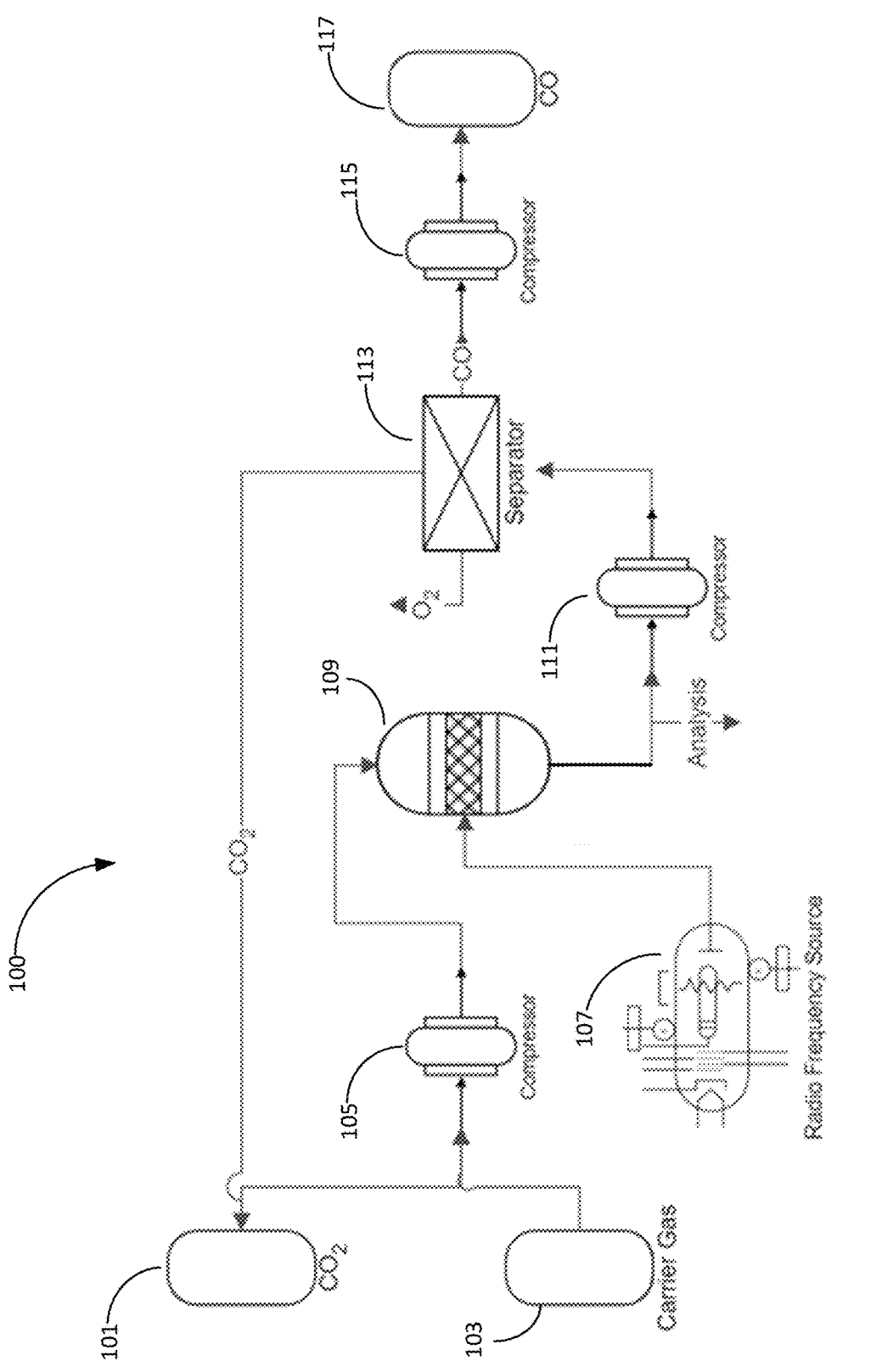
FIG. 1 illustrates an implementation of a system employing a radio frequency (RF) source to disassociate a molecule.

FIG. 1 illustrates an implementation of a system 100 that employs a RF power source 107 to disassociate carbon dioxide molecules. The system 100 comprises a plurality of gas reservoirs 101 and 103. In some implementations, the gas reservoirs may comprise carbon dioxide and other carrier gas. In some implementations, the gas reservoirs may comprise a mixture of greenhouse gases. The system further comprises a compressor 105 that compresses the gases from the reservoirs 101 and 103. The compressed gas mixture is input into a disassociation chamber 109 for breaking down the molecules of carbon dioxide and other greenhouse gases. RF power from the RF power source 107 is input to the disassociation chamber 109. The applied RF power can breakdown the carbon dioxide and other greenhouse gas molecules within the disassociation chamber 109 via several mechanisms including but not limited to plasma assisted disassociation; exciting rotational/vibrational modes of the carbon dioxide molecule and/or other gas molecules; causing the carbon dioxide and/or other gas molecules to ionize and further exciting higher order rotational/vibrational modes of the ionized molecules. In some implementations, the frequency of the applied RF power can be tuned to a resonance frequency of one or more gas molecules in the chamber 109. In some implementations, catalysts such as steam, copper, titanium dioxide can be introduced in the chamber 109 to assist in the disassociation of the carbon dioxide and/or other gas molecules. The byproducts of the disassociation can be analysed, separated using a separator 113 and further compressed using compressor 115 and stored in a reservoir 117. Although, a single reservoir is shown in FIG. 1 to store the byproducts of the disassociation, in other implementations several reservoirs may be provided to store the different byproducts of the disassociation. The undisassociated carbon dioxide and other gases can be recycled back to the gas reservoirs 101, 103. In some implementations gases with having large molecules can be introduced in the disassociation chamber to increase the mean free path between the various by products (e.g., carbon monoxide and oxygen) after the disassociation.

Figure 2:
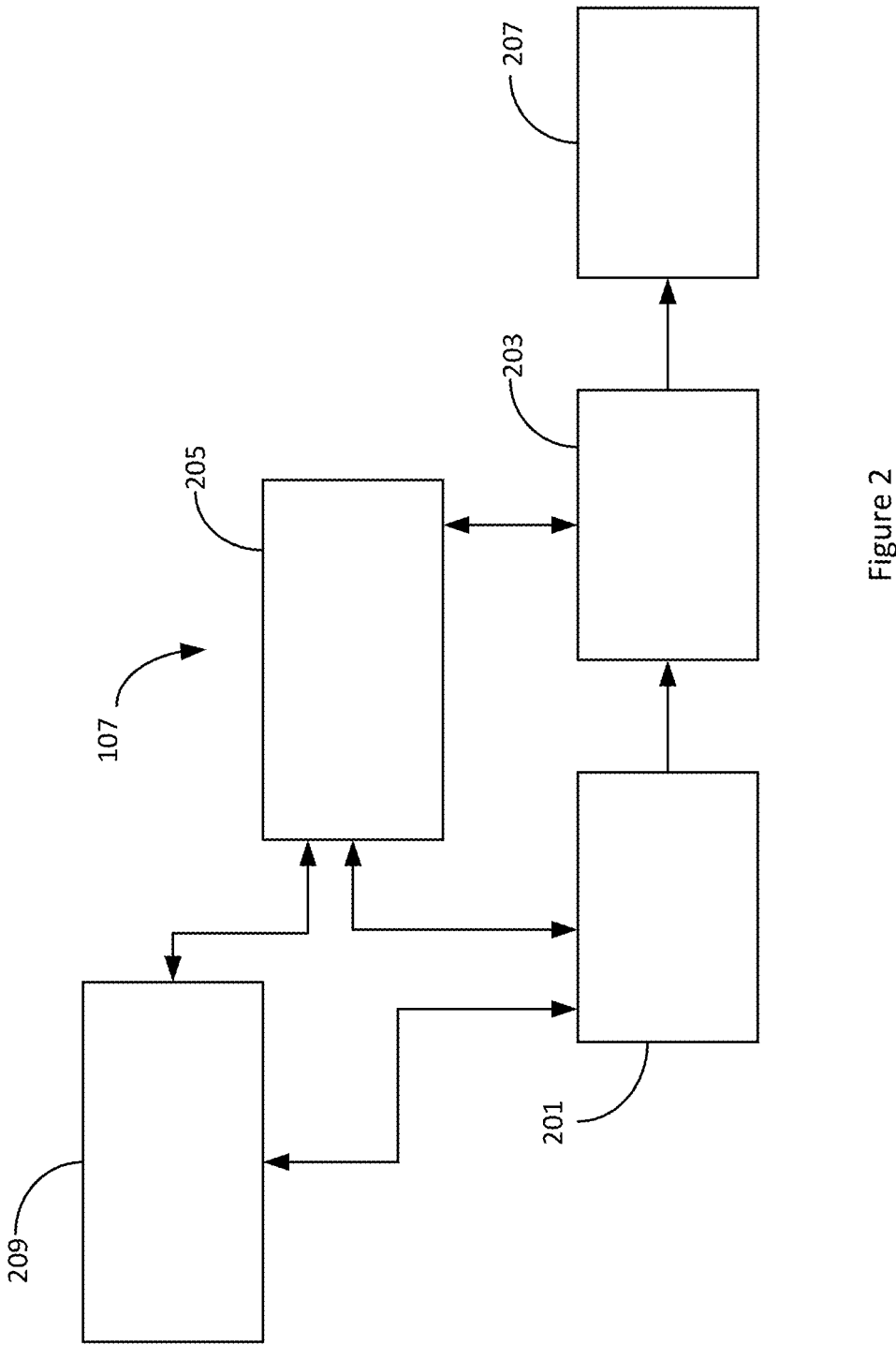
FIG. 2 illustrates an embodiment of the RF source.

FIG. 2 illustrates an implementation of the RF power source 107. The RF power source 107 comprises a software defined RF generator 201, an amplifier system 203 comprising one or more solid-state amplifiers, a bias control module 205, and an output channel 207 to conduct RF power from the amplifier system 203 to the disassociation chamber 109. The output channel 207 can comprise coaxial cables, one or more antennas, one or more electrodes, one or more waveguides, etc. The type of output channel 207 can depend on the design of the disassociation chamber 109 and the mechanism of the disassociation.

The RF generator 201 can comprise a software controlled RF generator (e.g., direct digital synthesizer (DDS), RF system on chip (RFSoC), RF system on module (RFSoM)) which can generate pulsed or continuous wave (CW) RF waveforms with variable frequency. The frequency and other parameters (e.g., power, pulse width, duty cycle, chirp, modulation) of the generated RF waveform can be controlled externally by a user or an external controller. Without any loss of generality, the frequency, pulse width, duty cycle, chirp and other parameters can be varied to increase the efficiency of disassociation of a target gas molecule (e.g., carbon dioxide). For example, the RF generator 201 can be controlled to produce a chirp waveform that matches the vibrational relaxation of carbon monoxide and/or oxygen to prevent relaxation. Vibrational modes can excite and relax on different time scales. A desired vibrational mode maybe short lived. By creating a chirped waveform, the lifetime of a desired vibrational mode may be extended. As another example, the frequency of the generated RF waveform can be tuned to match a resonance frequency of one or more gas molecules.

The software controlled RF generator 201 can be controlled by a computing system 209. The computing system 209 can selects RF waveform parameters based on a user instruction or based on a composition of the gases in the disassociation chamber 109, which are passed to the RF signal generator 201. In various implementations, the RF signal generator 201 can be programmable and controlled by the computing system 209 to change various parameters of the generated RF signal including but not limited to frequency and power of the RF signal. The RF signal generator 201 creates RF signals in accordance with the RF waveform parameters. Each RF signal has a waveform of the frequency, pulse width, pulse repetition interval and intra-pulse modulation specified by the RF waveform parameters received from the computing system 209. The frequency, pulse width, pulse repetition interval and intra-pulse modulation of the generated RF signal can be changed by the computing system 209 in real time or sufficiently real time. Although, in the illustrated implementation, the computing system 209 is distinct from the RF signal generator 201, in various other implementations, the computing system 209 and the RF signal generator 201 can be integrated together.

The amplifier system 203 can comprise one or more solid-state power amplifiers, each of which has a gate voltage on set point derived from an automatic calibration operation, as detailed below. In implementations of the amplifier system 203 comprising a plurality of solid-state power amplifiers, some may be arranged serially/sequentially. In some other implementations, some of the plurality of solid-state power amplifiers may be arranged in a power combining configuration. The amplifier system 203 produces an amplified RF signal having RF power ranging from a few Watts to a few kiloWatts. The amplifier system 203 may utilize a combination of solid-state amplifiers, including silicon laterally diffused metal-oxide semiconductors, Gallium Nitride, Scandium Aluminum Nitride, GaAs and InP.

The bias control module 205 is connected with the RF signal generator 201 and the computing system 209. The bias control module 205 also sends control signals to turn on/turn off the amplifiers in the amplifier system 203 synchronously with the output of the RF signal generator 201. Accordingly, the bias control module 205 ensures that the amplifiers in the amplifier system 203 are turned on only when RF signal is output from the RF signal generator 201. In this manner, the bias control module 205 can improve the power efficiency of the amplifier system 203. The bias control module 205 ensures that little (e.g., micro to nano amps) leakage or quiescent current is drawn when an RF signal is not being generated. The leakage and quiescent current can be quite large in high power amplifiers circuits if not gated. In one embodiment, the RF signals and power gating signals are turned on and off in 10 s of nanoseconds.

As discussed in detail below with reference to FIG. 3, the bias control module 205 can comprise a power adapting system 307 that can convert the power from an external power supply 303 to power levels required to drive the amplifiers in the amplifier system 203. The bias control module 205 further comprises a sensing system 321 that senses the current and/or voltage levels at different nodes of the amplifiers in the amplifier system 203. The bias control module can adjust the bias voltages/currents provided to the amplifiers in the amplifier system 203 based on the sensed current and/or voltage levels.

Power efficiency and linearity are important figures of merits (FoMs) for amplifier based systems. Power efficiency in field effect transistor (FET) amplifier (e.g., gallium nitride (GaN) FET amplifier) based systems can be improved by controlling the voltages provided to the gate and the drain terminals of a FET amplifier. Various implementations of a FET or a High Electron Mobility Transistor (HEMT) amplifier that is configured to be operated in saturation can benefit from a bipolar gate supply which can source and sink current. The bipolar gate supply can advantageously maintain the gate voltage at a desired voltage level.

Various implementations described herein include a bipolar high impedance gate driver that can source or sink current when the amplifier is operated at or near saturation. In addition to maintaining the gate voltage at a desired level, the bipolar high impedance gate driver can draw minimal amount of DC current and dynamically provide current to the gate terminal of the amplifier when the signal to be amplified is input to the amplifier. Various implementations of a bipolar high impedance gate driver described herein comprise an operational amplifier (opamp). The bipolar high impedance gate driver can improve various measures of efficiency for amplifier-based systems including drain efficiency, power-added efficiency, total efficiency, amplifier efficiency and wall-plug efficiency.

In various implementations, the bias control module 205 is configured to (i) in response to receiving a signal from the RF generator 201 provide appropriate bias voltages and currents to turn-on the amplifiers in the amplifier system 203 prior to/synchronously with the arrival of the RF signal from the RF generator 201; (ii) adjust or change the bias voltages and currents to the amplifiers based on information obtained about the input signal characteristics, output signal characteristics, system operating conditions (e.g., operating temperature, operating currents/voltages at various terminals of the amplifier/system, etc.), an input received from a user or an electronic processing system controlling the biasing systems and/or by information obtained from look-up tables that provide an understanding of the state of the amplifier; and/or (iii) reduce the bias voltages and currents to turn-off the amplifiers in the amplifier system 203 in response to absence of signal to be amplified or a sensed characteristic (e.g., input signal power, output signal power, temperature, gate current/voltage or drain current/voltage) being outside a range of values.

As discussed above, the bias control module 205 can comprise sensors (e.g., current sensors) that can sense current values (e.g., drain and/or gate current values) of the individual amplifiers in the amplifier system 203. The bias control module 205 can be configured to sense the current values of the individual amplifiers in the amplifier system 203 intermittently (e.g., periodically). In some implementations, the bias control module 205 can be configured to sense the current values of the individual amplifiers in the amplifier system 203 continuously. In various implementations, the output from the current sensor can be sampled using an analog to digital converter (ADC) and averaged over a number of samples (e.g., 128 samples, 512 samples, etc.) to obtain the sensed current value.

The sensed current value can be analyzed by the bias control module 205 to determine an operational or a physical characteristic (e.g., temperature, input/output signal power, voltage/current at various terminals of the amplifier) of the individual amplifier. For example, a sensed current value above a first threshold current value when the amplifier is not turned on can be indicative of a defect in the amplifier or a defect in the circuit board on which the amplifier is mounted. As another example, a sensed current value above a second threshold current value when the amplifier is turned on but no signal to be amplified is provided to the input can be indicative of a defect in the amplifier or a rise in the temperature of the amplifier. As yet another example, a sensed current value above a third threshold current value when the amplifier is turned on and a signal to be amplified is provided to the input can be indicative of a defect in the amplifier or a rise in the temperature of the amplifier. Accordingly, the bias control module 205 can be configured to compare individual amplifier current values to target amplifier current values to identify an amplifier state error. In response to determining that the amplifier current value of a particular amplifier has deviated from a target amplifier current value (e.g., first, second or third threshold values discussed above), the bias control module 205 is configured to determine the amount by which values of the voltages/ current provided to the amplifier should be offset to achieve efficient operation of the amplifier and provide that offset value. In various implementations, one or more of tasks of correlating the sensed current values to a physical characteristic of the amplifier or determining the amount by which values of the voltages/current provided to the amplifier should be offset by to achieve efficient operation of the amplifier can be performed by the computing system 209 instead of the bias control module 205.

The target amplifier current values may be based upon several factors for optimal system operation. For example, the target amplifier current values may be calibration amplifier current values for specified temperatures. The target amplifier current values may be calibration amplifier current values to compensate for amplifier manufacturing process variations. The target amplifier current values may be calibration amplifier current values to compensate for voltage variations. The target amplifier current values may be calibration amplifier current values to compensate for radio frequency phase variations. The target amplifier current values may be historical performance amplifier current values. The historical performance amplifier current values may be used to identify amplifier degradation over time.

Without any loss of generality, the bias control module 205 can comprise a variety of sensors. For example, the bias control module 205 can comprise voltage sensors configured to measure voltages at the various parts of the amplifiers in the amplifier system 203. As another example, the plurality of bias control module 205 can comprise temperature sensors configured to measure temperature of the amplifiers in the amplifier system 203. The temperature sensors can be configured to measure the device temperature of the amplifiers in the amplifier system 203 or temperature of the housing or the mount on which the amplifiers in the amplifier system 203 are disposed.

Without any loss of generality, the amplifiers in the amplifier system 203 can comprise three terminal semiconductor devices, such as, for example, a field effect transistor (FET). The bias control module can advantageously increase or optimize one of more figures of merit (e.g., output power, power efficiency, linearity, etc.) of the amplifiers. As a part of initialization procedure, the different amplifiers in the amplifier system 203 are characterized to correlate the different bias settings (e.g., gate voltage, drain voltage, drain current, gate current) to the gain and/or the power output from the amplifiers at different temperatures. The characterized information is stored in a memory associated with the bias control module 205. The characterization can be done when the system 100 is built and then subsequently as part of maintenance of the phased array system. For example, after the initial characterization when the system 100 is built, further characterization of the amplifiers can be performed once or twice a year.

When the system 100 is turned on, the voltage at the drain terminal of the amplifiers in the amplifier system 203 is set to a threshold drain bias voltage. In some implementations, the threshold drain bias voltage can correspond to a drain bias voltage that maximizes the power output from the amplifiers. In some implementations, the threshold drain bias voltage can correspond to a drain bias voltage that is required to operate the amplifiers in saturation or close to saturation. In some implementations, the threshold drain bias voltage can correspond to a drain voltage that optimizes the power output from the amplifiers and the drain efficiency. In yet some other implementations, the threshold drain bias voltage can correspond to a drain voltage that is a maximum allowable drain bias voltage that doesn't cause the amplifier to break down. The bias voltage at the gate terminal of the amplifiers in the amplifier system 203 is set to a voltage that is below the turn-on voltage of the amplifier. Upon receiving indication that electromagnetic radiation will be input to the amplifiers in the amplifier system 203, the bias control module can apply an offset voltage to gate terminals of the amplifiers in the amplifier system 203 that would raise the voltage at the gate terminal of individual amplifiers in the amplifier system 203 to a level that would cause a threshold amount of drain current to flow through the amplifier. The threshold amount of drain current can be a drain current that maximizes the output power from the amplifier. The threshold amount of drain current can be a drain current that optimizes power out from the amplifier as well as the power efficiency. The threshold amount of drain current can correspond to a drain current that optimizes output power, linearity and efficiency. The threshold drain current and the gate bias voltage (or offset voltage) which causes the threshold drain current to flow through the amplifier may be different for different amplifiers in the amplifier system 203. The difference in the threshold drain current and the gate bias voltage (or offset voltage) can be attributed to variation in temperature, voltage, variation in load and/or impedance, or process variations between the different amplifiers. The RF power output from the amplifier system 203 is optimized by optimizing the power out from individual amplifiers by setting the gate voltage (or the offset voltage) of an individual amplifier to a value that causes a threshold amount of drain to flow through the amplifier.

During the operation, the drain current can be sensed from time to time and the gate bias voltage (or offset voltage) is adjusted/modulated to maintain the drain current at the threshold current level. The drain current can be sensed periodically or intermittently. In some implementations, the drain current can be sensed every at intervals less than 10 microseconds (e.g., less than 1 microsecond, less than 5 microseconds) and the gate bias voltage (or the offset voltage) can be adjusted to maintain the drain current at the threshold amount. In some implementations, the drain current can be continually sensed and the gate bias voltage (or the offset voltage) can be continuously adjusted to maintain the drain current at the threshold level. In some implementations, the gate bias voltage and the drain bias voltage can be modulated together to maintain the drain current at the threshold amount.

In various implementations, the gate bias voltage and the drain bias voltage can be modulated based on other sensed parameters, such as, for example, temperature, input signal power, output signal power, a measure of linearity of the output signal, or Voltage Standing Wave Ratio (VSWR) characteristics in addition to or instead of the sensed drain current.

Figure 3:
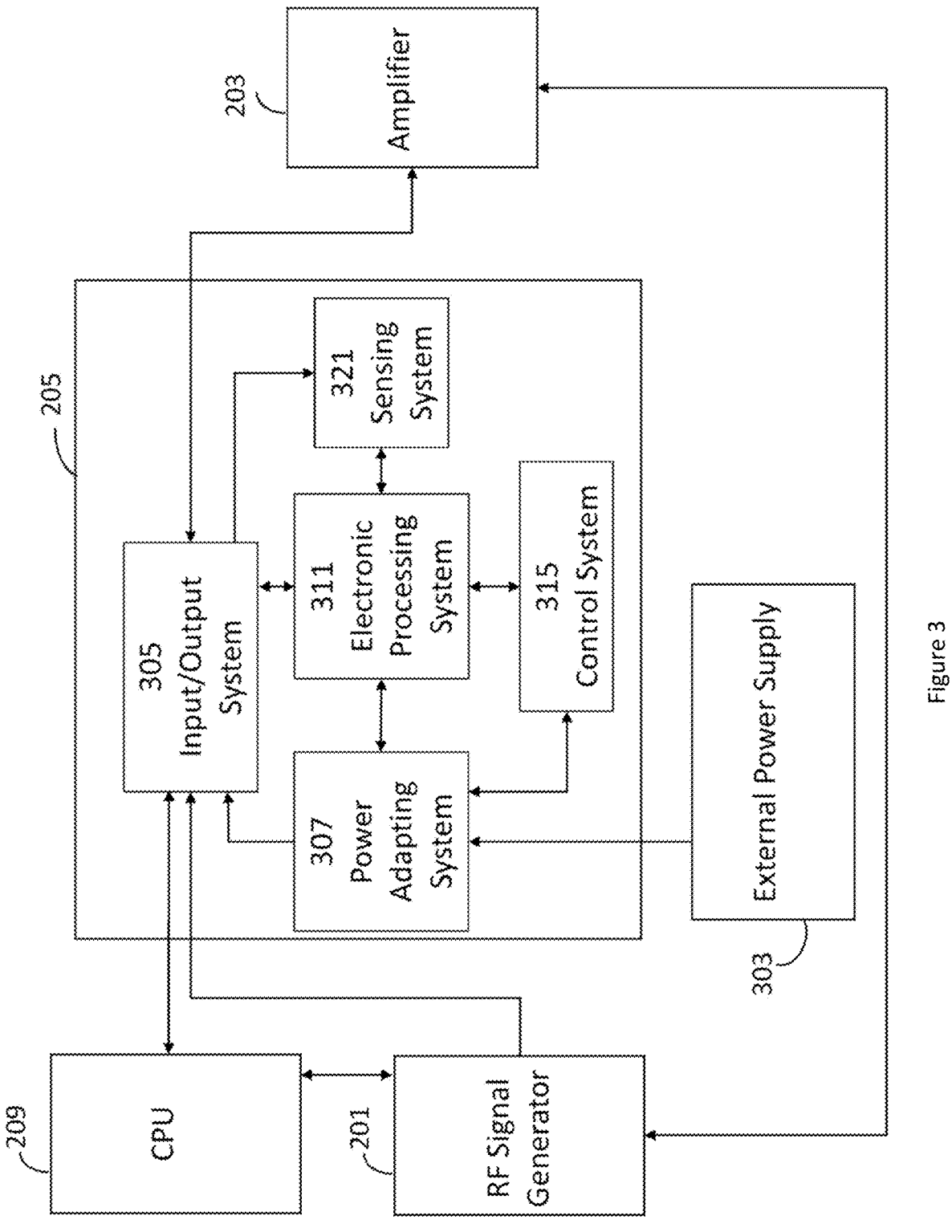
FIG. 3 illustrates an implementation of a bias control and sensing module configured to control the bias power provided to an amplifier of the RF source.

FIG. 3 illustrates an implementation of the bias control module 205. The bias control module 205 can include various functional sub-systems, such as an electronic processing system 311, a control system 315, a memory (not shown), a sensing system 321, a power adapting system 307, and an input/output system 305. The various functional sub-systems can be integrated in a single housing or in separate housings. In implementations where the different functional sub-systems are integrated in separate housings, the separate housings can include processing electronics and communication systems to communicate and function properly. For example, in some implementations, the power adapting system 307 and the sensing system 321 can be integrated in a separate housing. In such implementations, the electronic processing system 311 in cooperation with the control system 315 and the memory can provide signals to the power adapting system 307 to turn-on/turn-off the biasing voltages and currents to the amplifiers in response to receiving a signal from the RF generator 201 indicating the start/end of the RF signal and/or receiving information from the sensors that one or more sensed parameters are out of a range of values.

The bias control module 205 can be implemented with a form factor of a field programmable gate array (FPGA) or an application specific integrated circuit (ASIC). The ASIC implementation may be advantageous to realize smaller form factors, such as, for example, a chip having a size of a 10 mm×10 mm, 5 mm×5 mm or 3 mm×3 mm. The bias control module 205 is configured to obtain information about the signals to be amplified and monitor various currents and voltages of the amplifier to optimize and control operating currents and voltages of the amplifier. The bias control module 205 can obtain the information about the signals to be amplified and the currents/voltages at various terminals of the amplifier in real time or substantially in real time. For example, the bias control module 205 can obtain the information about the signals to be amplified and the currents/voltages at various terminals of the amplifier in a time interval less than about 1 second, in a time interval greater than or equal to about 1 millisecond and less than about 1 second, in a time interval greater than or equal to about 1 second and less than about 10 seconds, in a time interval greater than or equal to about 10 seconds and less than about 30 seconds, in a time interval greater than or equal to about 30 seconds and less than about 1 minute and/or in a range defined by any of these values.

The bias control module 205 can provide several benefits including but not limited to increasing/optimizing power efficiency for a desired performance criterion. For example, consider that an amplifier in the amplifier system 203 is operated in a high gain regime to provide a certain amount of RF output power. The power efficiency of that amplifier can be higher than a similar amplifier that is operated in a high gain regime to provide the same amount of RF output power but is not controlled by the bias control module 205. As another example, consider that an amplifier in the amplifier system 203 controlled by the bias control module 205 is operated to provide a certain amount of gain and linearity. The power efficiency of that amplifier can be higher than a similar amplifier that is operated to provide the same amount of gain and linearity but is not controlled by the bias control module. The use of the bias control module can also reduce direct current (DC) power consumption during operation of an amplifier as compared to direct current (DC) power consumption by an amplifier driven without a bias control module. The bias control module can improve linearity of an amplifier, help in automatic calibration of an amplifier over temperature, voltage and process variations.

The electronic processing system 311 can comprise a hardware processor that is configured to execute instructions stored in the memory which will cause the bias control module to perform a variety of functions including, but not limited to, turning on/off or reduce voltages/currents provided to various terminals of an amplifier in response to detecting that the signal to be amplified is turned on/off or sensing individual amplifier current values and change the values of different voltages and currents in response to the deviations of the sensed current values from target values.

The input/output system 305 can be configured to provide wired/wireless connection with external devices and systems. For example, the input/output system 819 can comprise an Ethernet port (e.g., a Gigabit Ethernet (GbE) connector) that provides connection to the computing system 209 and/or a router, one or more connectors that provide connection to the RF signal generator 201, a connector that provides connection with an external power supply, a plurality of connectors that provide voltages/currents to one or more amplifiers, a plurality of connectors that can receive voltage/current information from the one or more amplifiers, and connectors that provide connection with a user interface (e.g., a display device). In various implementations, the input/output system 305 can comprise a command and control link to receive messages from the RF generator 201 and/or computing system 209.

The input/output system 305 can be configured to receive as input, a signal/trigger/information from the RF signal generator 201 and use the information from this input to determine the voltages and current for an amplifier in the amplifier system 203. As discussed above, the input received from the RF signal generator can be a trigger that conveys information that the RF signal will be turning on in a short while and causes the bias control module 205 to start the power sequencing process and provide appropriate voltages and/or currents to bias the amplifiers in the amplifier system 203 prior to the arrival of the RF signal. For example, the input from the RF signal generator can be a pulse enable signal which is high when the RF signal is on and low when the RF signal is off. In various implementations, the input from the RF signal generator 201 can be representative of the waveform being output. In some implementations, the input can include instructions and/or settings to power up an amplifier in the amplifier system 203, and other data.

The input/output system 305 can comprise a communication system configured to communicate with external devices and systems. For example, the input/output system 305 can comprise Ethernet connectivity to send information including but not limited to amplifier health information, and efficiency statistics to the computing system 209. Ethernet connectivity can also help in synchronizing an array of many power management systems in phased array applications. The input/output system 305 comprises a plurality of connectors that are configured to provide voltages/currents to at least one terminal of an amplifier in the amplifier system 203. For example, the voltages and currents required to bias at least one of the gate, source and/or drain terminal of an amplifier in the amplifier system 203 can be provided through the output ports of the bias control module 205. The bias control module 205 can be configured to provide bias voltage and/or current to a plurality of amplifiers. For example, the bias control module 205 can be configured to provide bias voltage and/or current to two, four, six or more amplifiers.

The sensing system 321 can be configured to sense current values at one or more terminals of the amplifier as discussed above. In various implementations, the sensing system 321 comprises at least one current sensor and an analog to digital converter (ADC) configured to sample and average the output of the current sensor to obtain a sensed current value. In another implementation of the sensing system 321, the voltage drop across a resistor (e.g., a shunt resistor) connected to the drain terminal is measured. The drain current is obtained from the measured voltage drop and the value of the resistor. In such an implementation, the sensing circuit is designed to have low offset voltage and low noise which allows for greater accuracy in the measurement of the drain current. In various implementations, the current sensor need not be integrated with the other components of the sensing system 321 and/or the other subsystems of the bias control module 205. Instead, the current sensor can be integrated with the amplifier. The number of current sensors can vary based on the number of amplifiers being controlled by the bias control module 205 and the number of currents that are being monitored. For example, if the bias control module 205 is configured to control four distinct amplifiers and it is desired to monitor the drain current of each of the four separate amplifiers, then the bias control module 205 comprises four current sensors configured to monitor the drain current of each of the four distinct amplifiers.

The power adapting system 307 can be configured to convert power from an external power supply 303 (e.g., an AC power line, a battery source, a generator, etc.) to voltage and current waveforms required for operating the amplifiers being controlled by the bias control module 205. For example, in various implementations, the power adapting system 303 is configured to convert a 60V DC bus and generate appropriate voltage and current inputs for the various terminals of the amplifier. In some implementations, the power adapting system 303 may be configured to convert an incoming AC power line to DC power (e.g., DC voltages between about +20 Volts DC and about +80 Volts DC). The power adapting system 823 is configured to step up/down the converted DC voltage to appropriate voltages for the amplifier (e.g., in a voltage range between about +45 Volts and +70 Volts high voltage Gallium Nitride power amplifiers) through DC/DC converters. The stepped up/down voltages are provided to the various terminals of the amplifier (e.g., gate, drain, and/or source) in a sequence as discussed above in response to receiving a signal from the RF signal generator 201 and/or the computing system 209 that the signal to be amplified is turned on/being turned on.

In various implementations, the bias control module 205 comprises a "power gating" feature where the bias voltage/current at various terminals (e.g., gate, source, and/or drain) of the amplifier is adjusted in response to a sensed characteristic of the system. The sensed characteristics can comprise one or more of drain current, source current, gate current, gate voltage, drain voltage, voltage at different nodes of the amplifier system, current at different nodes of the amplifier system. In various implementations, in addition to or instead of modulating the gate and/or the drain bias voltage, voltages or currents at other nodes can be modulated to optimize the performance of the amplifier. The other nodes can comprise the source terminal, the back bias, the RF input circuits, RF output circuits, etc. In various implementations, the bias control module 205 can provide offset voltages that raise and lower the biasing voltage to turn on/turn off the power amplifier in response to the turning on and turning off the RF signal. For example, in an implementation of the amplifier system 203 comprising a GaN power amplifier, the bias control module 205 can toggle the gate voltage between about −5V (pinch off or turn off) and about −2.5V (saturation or turn on) at a frequency greater than or equal to 1 kHz and less than or equal to about 500 MHz. As another example, the gate voltage can be toggled between pinch off and saturation at a rate greater than or equal to about 10 MHz and less than or equal to about 100 MHz. Without any loss of generality, the bias control module 205 can be configured to turn-on and turn-off the amplifier in between pulses of a pulsed waveform. This can advantageously allow heat to dissipate from the amplifier in between pulses thereby reducing the rate at which the amplifier heats up and increase lifetime. Turning on and off the amplifier in between pulses of a pulsed waveform can also advantageously increase the power efficiency of the amplifier.

The control system 315 can be configured to control and/or manage various functions and processes of the bias control module 205. For example, the control system 315 independently or in co-operation with the computing system 209 and/or the RF generator 201 can control the order in which the voltage and current levels at various terminals of the amplifier are changed to power up/down the amplifier. As another example, the control system 315 independently or in co-operation with the computing system 209 and/or the RF generator 201 can control the raising and lowering of the voltage/current levels at the gate terminal of the amplifier synchronously with the incoming signal to be amplified. As yet another example, the control system 315 independently or in co-operation with the computing system 209 and/or the RF generator 201 can control the timing of turning on the various amplifiers in the amplifier system 203.

In various implementations, the bias control module 205 can be configured to protect the amplifiers from damage. The bias control module 205 can be configured to monitor voltages and/or currents at various terminals of the amplifier and turn-off the amplifier if the current and/or voltage at one or more terminals of the amplifier exceeds a certain limit. For example, the bias control module 205 can be configured to turn off an amplifier in the amplifier system 203 if the drain current of that amplifier exceeds a preset threshold. The threshold drain current for the various amplifiers controlled by the bias control module 205 can be programmed and stored in a memory accessible by the bias control module 205. The threshold drain current can be different when the RF signal is on and off. As another example, the bias control module 205 is configured to turn-off the amplifier if the rate of increase of the drain current of an amplifier during power up sequence is below a threshold rate. The threshold rate of increase of the drain current for the various amplifiers controlled by the bias control module 205 can be programmed and stored in a memory accessible by the bias control module 205. In various implementations, the bias control module 205 can be configured to monitor the duration of time an amplifier is on and turn off the amplifier if an amplifier is on for an amount time greater than a preset amount of time even if the RF signal is on. The preset amount of time can be programmed and stored in a memory accessible by the bias control module 205. In various implementations, an input switch can be provided in the input signal path of the amplifier. In such implementations, the bias control module 205 can be configured to open the input switch and disconnect the RF signal from the input to the amplifier if the voltage, current and/or duration of time the amplifier is on exceeds a limit. In various implementations, a load switch can be provided in the drain path of the amplifier. In such implementations, the load switch can be opened to disconnect the drain and prevent damage to the amplifier if the drain current exceeds a limit.

The bias voltage/current of an amplifier (e.g., a GaN power amplifier) that optimizes the power efficiency of amplifier can vary based on the device temperature. Thus, the power efficiency of an amplifier can degrade from an optimum power efficiency as the temperature of the amplifier changes. Without relying on any particular theory, the temperature of the amplifier can increase over the duration of time that the amplifier is in use. Thus, it is advantageous to intermittently obtain a measurement/estimate of the temperature of the amplifier during use and adjust the bias voltage/current to optimize power efficiency and/or other figures of merit of the amplifier. The bias voltage/current that optimizes power efficiency can also be affected due to degradation in the device performance due to defects during manufacturing, aging or a defect in the circuitry surrounding the amplifier.

While, a temperature sensor may provide information regarding the ambient temperature around the amplifier. In many implementations, it may not be practical to use a temperature sensor to obtain an estimate of the device temperature of the amplifier. However, the drain current can be correlated to the device temperature of the amplifier and can be used to measure the device temperature of the amplifier.

The drain current can also provide an indication of a degradation in the performance of the amplifier as a result of defects due to manufacturing/aging or a defect in the circuitry surrounding the amplifier. Thus, adjusting the biasing voltages/currents based on measuring the drain current can advantageously aid in optimizing power efficiency and other figures of merit of the amplifier. The drain current can be obtained under bias condition when the signal to be amplified is absent, when the signal to be amplified is present and/or in between signal pulses. As discussed above, the sensing system 321 is configured to sample the sensed current. A measurement of the drain current is obtained by averaging over a plurality of samples of the sensed current. The electronic processing system 311 can be configured to correlate the measured drain current to the device temperature of the amplifier and/or level of degradation of the amplifier. The electronic processing system 311 can be configured to correlate the measured drain current to the device temperature of the amplifier using algorithms and/or look-up-tables (LUTs).

As the device temperature of the amplifier changes the drain current also changes. To achieve the desired output power level, efficiency and other metrics, the electronic processing system 311 of the bias control module is configured to adjust the gate bias voltage of the amplifier as the temperature changes to maintain the threshold amount of drain current through the amplifier. The electronic processing system 311 can be configured to obtain the amount by which the gate voltage should be changed (also referred to herein as gate offset voltage) using algorithms and/or look-up-tables (LUTs). The gate offset voltage can be in a range between about 1 mV and about 500 mV. In various implementations, the signal to be amplified is turned off before changing the gate voltage by the offset amount. In some implementations wherein the signal to be amplified comprises pulses, the gate voltage is changed by the offset amount in the time interval between pulses. In some implementations, the gate voltage is changed by the offset amount when the signal to be amplified is on.

In addition to optimizing power efficiency based on device temperature and/or achieving a desired power efficiency at different temperatures, the bias control module 205 can also help in preventing a rapid increase in the device temperature by adjusting the gate bias voltage as the drain current changes to maintain an optimal gain and/or power efficiency. The effect of changing the gate bias voltage to maintain the threshold amount of drain current not only increases/maximizes the gain provided by the amplifier over time but also prevents a rapid increase in the temperature of the amplifier over time. Accordingly, systems including amplifiers controlled by a bias control module 205 that is configured to turn on/off the amplifier based on the presence/absence of the signal to be amplified as well as adjust the gate bias voltage based on the monitored drain current can operate efficiently and/or provide nearly constant gain at a wide range of temperatures (e.g., between about −20 degrees Celsius and about 90 degrees Celsius). In various implementations, by adjusting the gate bias voltage based on monitored drain current can maintain substantially constant power efficiency across a range of temperatures between about −20 degrees Celsius and about 90 degrees Celsius. For example, by adjusting the gate bias voltage based on monitored drain current the power efficiency can be maintained to be within ±10% of a desired value for temperatures between −20 degrees Celsius and about 90 degrees Celsius. The desired power efficiency value can be in a range between 40% and 75%. Such systems can also operate without the need for large and/or expensive cooling systems. In fact, many systems including amplifiers controlled by a power management system 809_1 that is configured to turn on/off the amplifier based on the presence/absence of the signal to be amplified as well as adjust the gate bias voltage based on the monitored drain current can function without any cooling systems, such as for example, electrical or electro-mechanical cooling systems.

Figure 4:
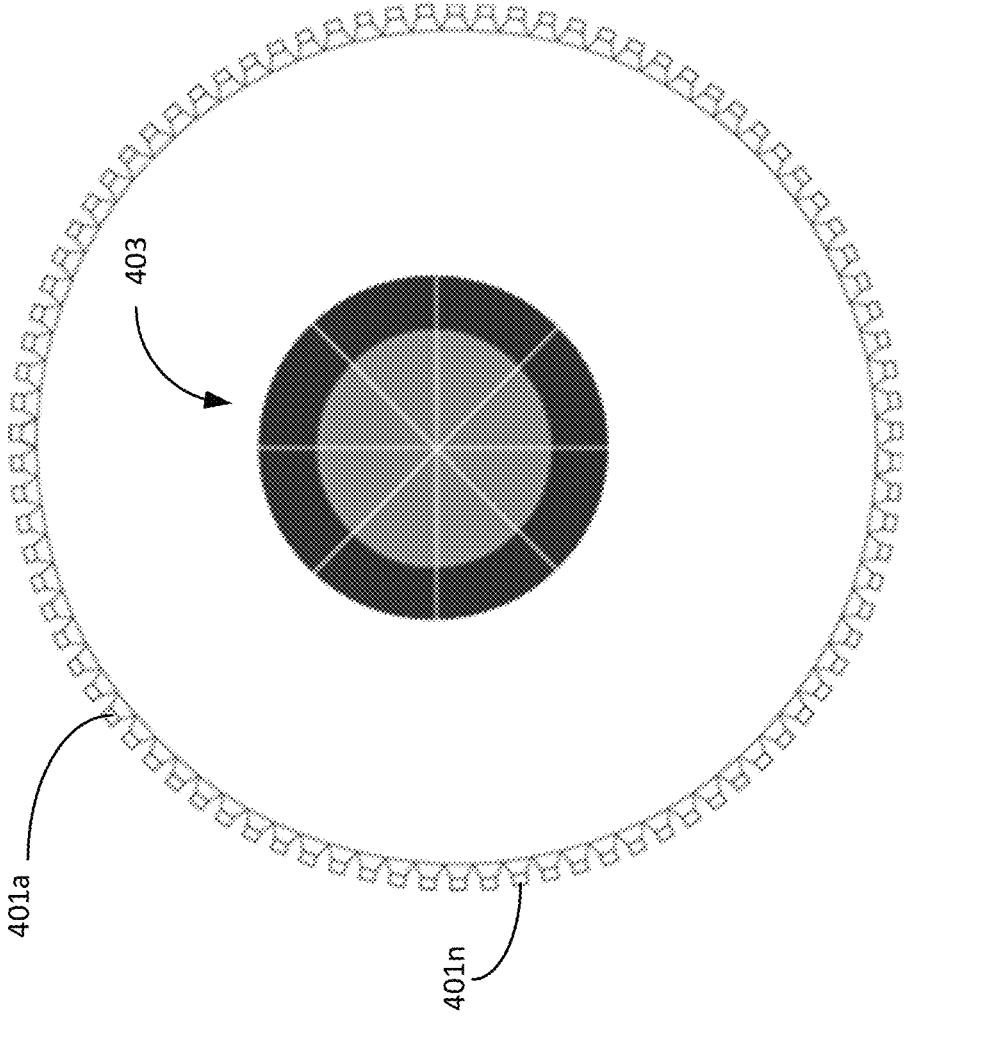
FIG. 4 illustrates an implementation of a horned antenna system configured to provide RF power to an enclosure.
Figure 5:
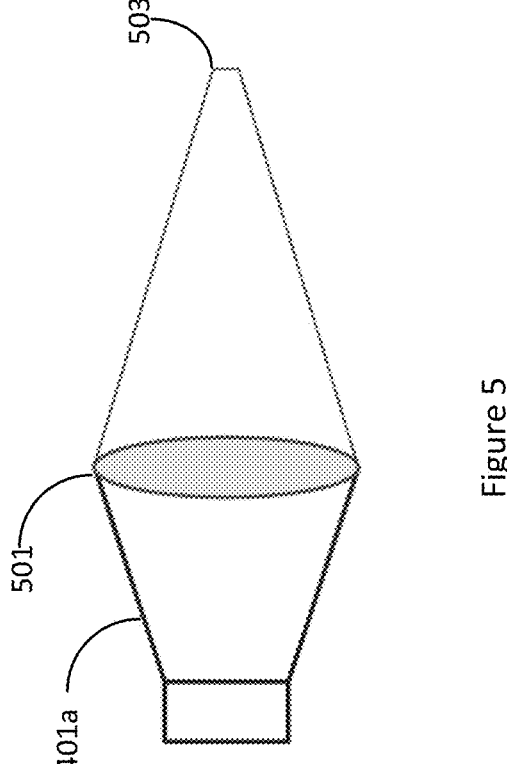
FIG. 5 illustrates an implementation of an antenna comprising a dielectric lens to focus RF radiation at a focal plane.

As discussed above, the power from the RF power source 107 is input to the disassociation chamber 109. In various implementations, the disassociation chamber 109 can comprise a smoke stack of a power plant or a refinery that emits various greenhouse gases including carbon dioxide. In some such implementations, the disassociation chamber can comprise a plurality of antennas 401a, . . . , 401n as show in FIG. 4. The plurality of antennas can amplify and concentrate RF energy from the RF power source 107 to disassociate molecules of greenhouse gases within an enclosed volume 403 with increased efficiency of disassociation. In some implementations, a dielectric lens can be coupled with one or more of the plurality of antennas to focus RF energy from the RF power source 107 in the enclosed volume 403, as shown in FIG. 5. Without any loss of generality, the antenna can be disposed in a circular or a helical arrangement.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes disclosed and/or illustrated may differ from those shown in the figures. Depending on the embodiment, certain of the steps described above may be removed, others may be added. For example, the actual steps and/or order of steps taken in the disclosed processes may differ from those described and/or shown in the figure. Depending on the embodiment, certain of the steps described above may be removed, others may be added. For instance, the various components illustrated in the figures and/or described may be implemented as software and/or firmware on a processor, controller, ASIC, FPGA, and/or dedicated hardware. Furthermore, the features and attributes of the specific embodiments disclosed above may be combined in different ways to form additional embodiments, all of which fall within the scope of the present disclosure.

In some cases, there is provided a non-transitory computer readable medium storing instructions, which when executed by at least one computing or processing device, cause performing any of the methods as generally shown or described herein and equivalents thereof.

Any of the memory components described herein can include volatile memory, such random access memory (RAM), dynamic random access memory (DRAM), synchronous dynamic random access memory (SDRAM), double data rate (DDR) memory, static random access memory (SRAM), other volatile memory, or any combination thereof. Any of the memory components described herein can include non-volatile memory, such as magnetic storage, flash integrated circuits, read only memory (ROM), Chalcogenide random access memory (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Any user interface screens illustrated and described herein can include additional and/or alternative components. These components can include menus, lists, buttons, text boxes, labels, radio buttons, scroll bars, sliders, checkboxes, combo boxes, status bars, dialog boxes, windows, and the like. User interface screens can include additional and/or alternative information. Components can be arranged, grouped, displayed in any suitable order.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, or within less than 0.01% of the stated amount.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

The foregoing description, for purposes of explanation, used specific nomenclature to provide a thorough understanding of the disclosure. However, it will be apparent to one skilled in the art that specific details are not required in order to practice the disclosed embodiments. Thus, the foregoing descriptions of specific embodiments are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the claims as presented herein or as presented in the future and their equivalents define the scope of the protection.

What is claimed is:

1. A molecule disassociation system configured to disassociate one or more gas molecules, the system comprising:
   a disassociation chamber configured to enclose a volume of a gas; and
   a radio frequency (RF) circuitry configured to provide RF power to the disassociation chamber, the RF circuitry comprising:
      a radio-frequency generator configured to generate an electromagnetic (EM) radiation having a frequency between about 20 MHz and about 10 THz, wherein a frequency of the EM radiation is adjusted to match a resonant frequency of a gas molecule to be disassociated;
      a radio-frequency amplifier configured to amplify the generated EM radiation; and
      an output channel comprising a plurality of antennas configured to direct the amplified EM radiation towards the volume of gas in the disassociation chamber;
   wherein the disassociation chamber is configured to be positioned in a chimney, an exhaust pipe, or a smokestack, and
   wherein the plurality of antennas are arranged in a circle, a helix, or a spiral along an entirety of a perimeter of the disassociation chamber.

2. The system of claim 1, wherein the RF power generates a plasma within the disassociation chamber.

3. The system of claim 2, wherein the generated plasma is a room temperature plasma.

4. The system of claim 1, wherein a power or a frequency of the RF power is configured to disassociate one or more molecules of the gas.

5. The system of claim 1, wherein the gas comprises at least one of carbon dioxide, methane, a greenhouse gas, carbon monoxide, hydrocarbons, sulfur dioxide, oxygen, or water vapor.

6. The system of claim 1, wherein the disassociation chamber comprises an inlet to intake the gas and an outlet to remove byproducts after disassociation.

7. The system of claim 1, wherein a catalyst is introduced into the disassociation to increase efficiency of disassociation of the gas molecule.

8. The system of claim 7, wherein the catalyst comprises steam, copper or titanium dioxide.

9. The system of claim 1, wherein a frequency of the RF power is further adjusted to match a relaxation frequency of a byproduct.

10. The system of claim 1, wherein a power level of the RF power is adjusted to generate a plasma within the disassociation chamber.

11. The system of claim 1, wherein a power level of the RF power is configured to raise temperature of the gas in the disassociation chamber to a temperature between about 3000 degree Kelvin and about 7000 degree Kelvin.

12. The system of claim 1, wherein a power level of the RF power is configured to ionize the molecules of the gas.

13. The system of claim 1, wherein the RF circuitry comprises a plurality of electromagnetic (EM) radiators comprising one or more RF generators and one or more RF amplifiers.

14. The system of claim 1, wherein an antenna of the plurality of antennas comprises a dielectric lens to focus EM radiation in a volume of the disassociation chamber.

15. The system of claim 13, wherein the plurality of EM radiators are co-planar.

16. The system of claim 13, wherein the plurality of EM radiators are non-coplanar.

17. The system of claim 1, wherein the radio-frequency generator comprises a software-defined radio-frequency generator.

18. The system of claim 1, wherein the plurality of antennas are arranged in a circle along the entirety of the perimeter of the disassociation chamber.

19. The system of claim 1, wherein the plurality of antennas are arranged in a helix along the entirety of the perimeter of the disassociation chamber.

20. The system of claim 1, wherein the plurality of antennas are arranged in a spiral along the entirety of the perimeter of the disassociation chamber.

* * * * *